United States Patent Office 3,711,484
Patented Jan. 16, 1973

3,711,484
DERIVATIVES OF N-METHYLPIPERAZINE
Andrea Pedrazzoli and Leone Dall'Asta, Milan, Italy, assignors to MIDY, Paris, France
No Drawing. Continuation-in-part of application Ser. No. 660,227, Aug. 14, 1967, now Patent No. 3,580,914, dated May 25, 1971. This application Oct. 5, 1970, Ser. No. 78,236
Claims priority, application Great Britain, Aug. 23, 1966, 37,827/66
Int. Cl. C07d 51/70
U.S. Cl. 260—268 R
8 Claims

ABSTRACT OF THE DISCLOSURE

This invention relates to N-methyl-N'-ethyl-piperazines in which the ethyl radical is $\beta,\beta$-disubstituted with (i) a phenyl or phenoxymethylene radical which is unsubstituted or substituted in the ring with one alkyl or cycloalkyl group or with 2 or 3 chlorine atoms or with 2 chlorine atoms and a nitro group, and (ii) a benzyloxy radical substituted in the ring with 1, 2 or 3 chlorine atoms; and pharmaceutically acceptable acid addition salts thereof. All of the compounds have anti-bacterial and antiprotozoan activity.

This is a continuation-in-part application of patent application Ser. No. 660,227, filed on Aug. 14, 1967, now U.S. Pat. 3,580,914.

The present invention relates to new therapeutically useful derivatives of N-methylpiperazine, which have the general structural formula:

$$R-CH-CH_2-N\underset{OR_1}{\diagdown}N-CH_3$$

in which

R is a phenyl or phenoxymethylene radical unsubstituted or substituted in the ring with straight or branched aliphatic chains having 4 to 12 carbon atoms, with cycloalkyl groups having 5 or 6 carbon atoms, with two or three chlorine atoms or with two chlorine atoms and one nitro group; and $R_1$ is a benzyl radical substituted in the ring with one, two or three atoms of chlorine.

The process of preparation of the compounds according to the invention can be represented by the following reaction scheme:

$$R-CH-CH_2-N\diagdown N-CH_3 + R_1X \longrightarrow$$
$$\phantom{R-CH}OH$$
$$(I) \qquad\qquad (II)$$

$$R-CH-CH_2-N\diagdown N-CH_3$$
$$\phantom{R-CH}OR_1$$
$$(III)$$

in which X represents a halogen atom and R and $R_1$ have the same meanings as above.

The compounds of the invention are obtained by reaction of the amino alcohol (I) with the halide (II) of a substituted benzyl, in an inert organic solvent such as benzene, toluene, xylene or tetrahydrofuran, in the presence of an alkali metal or alkaline earth metal hydride, preferably sodium hydride.

The reaction takes place at a temperature of 70°–145° C., preferably 110°–120° C., for 5–20 hours, preferably for 15–19 hours.

The products of the invention are separated in the form of salts with pharmaceutically useful inorganic or organic acids, such as the hydrochloride, sulphate, phosphate or citrate.

The starting materials are obtained by the following procedures:

(a) In the case where R is a substituted phenyl radical as indicated above, the ω-halo-ketone (IV) is reacted with N-methylpiperazine according to known techniques and the product obtained (V) is reduced with sodium borohydride to give the desired intermediate (VI):

$$R_3\overset{R_2}{\diagup}\!\!-\!\!CO-CH_2Cl + HN\diagdown N-CH_3 \longrightarrow$$
$$R_4$$
$$(IV)$$

$$R_3\overset{R_2}{\diagup}\!\!-\!\!CO-CH_2-N\diagdown N-CH_3 \longrightarrow$$
$$R_4$$
$$(V)$$

$$R_3\overset{R_2}{\diagup}\!\!-\!\!CH-CH_2-N\diagdown N-CH_3$$
$$R_4 \phantom{---} OH$$
$$(VI)$$

wherein $R_2$ represents a $C_4$–$C_{12}$ straight or branched alkyl group, a $C_5$–$C_6$ cycloalkyl group, a nitro group or a hydrogen atom, and $R_3$ and $R_4$ which can be the same or different represent a chlorine or hydrogen atom, according to the above definitions of the substituents in R nuclei;

(b) In the case where R is a substituted phenoxymethylene, the epoxide (VII) is reacted with N-methylpiperazine to give the desired intermediate (VIII):

$$R_3\overset{R_2}{\diagup}\!\!-\!\!O-CH_2-CH\overset{\diagdown}{\underset{O}{\diagup}}CH_2 + HN\diagdown N-CH_3 \longrightarrow$$
$$R_4$$
$$(VII)$$

$$R_3\overset{R_2}{\diagup}\!\!-\!\!O-CH_2-CH-CH_2-N\diagdown N-CH_3$$
$$R_4 \phantom{-----} OH$$
$$(VIII)$$

wherein $R_2$, $R_3$ and $R_4$ have the meaning defined above in (a).

The compound (VIII) can also be synthesized by the reaction:

$$CH_3-N\diagdown N-CH_2-CH\overset{\diagdown}{\underset{O}{\diagup}}CH_2 + HO-\overset{R_2}{\diagup}\!\!\overset{R_3}{\diagdown} \longrightarrow$$
$$R_4$$
$$(IX)$$

$$CH_3-N\diagdown N-CH_2-CH-CH_2-O-\overset{R_2}{\diagup}\!\!\overset{R_3}{\diagdown}$$
$$\phantom{CH_3-N\diagdown N-CH_2-}OH \phantom{-}R_4$$
$$(VIII)$$

In this case, the 1-(2',3'-epoxypropyl)-4-methyl-piperazine (IX) is reacted according to known techniques with an aqueous alkaline solution of the phenate.

All the products of the invention have a remarkable antibacterial activity, their spectrum extending both to Gram-positive and Gram-negative organisms; also, they have a clear action on *Candida albicans* and on other mycetes.

The compounds of the invention also have a marked antiprotozoan activity, especially trichomoricidal and amibicidal, at low concentration.

The cytostatic activity "in vitro" and "in vivo" is also notable.

Nearly all the compounds of the invention have a low acute toxicity, are well tolerated in animals and exhibit no toxic manifestations, following prolonged administration.

The following examples illustrate the invention without limiting it.

EXAMPLE 1

N-methyl-N'-[β-(4-chlorobenzyloxy)-β-(4'-cyclopentyl-phenyl)-ethyl]-piperazine dihydrochloride A mixture of 28.8 g. (10.1 moles) of N-methyl-N'-[β-hydroxy-β-(4-cyclopentyl-phenyl)-ethyl] - piperazine, 5.3 g. (0.11 mole) of sodium hydride in 50 p. 100 oily suspension and 300 ml. of anhydrous toluene was heated at 120° C. for 1 hour. The mixture was cooled to 50° C. and treated with a solution of 17.7 g. (0.11 mole) of p-chlorobenzyl chloride in 50 ml. of anhydrous toluene.

The mixture was heated under reflux for 16 hours, then cooled and treated with 350 g. of ice and the aqueous solution was separated and rewashed with water.

The organic phase was extracted with 300 ml. of 2 N HCl. The acidic solution rendered alkaline with 40% NaOH was extracted with ethyl ether. The concentrated and dried ethereal extract gave 35 g. of dense oil.

The oil dissolved in isopropanol and acidified with HCl gave 21 g. of crystals which were recrystallized from a 3.2 mixture of isopropanol and ethanol to give 17 g. of product having a melting point=223–225° C.

From the concentrated combined mother liquors, another 5.3 g. of product having a melting point=222–224° C. was obtained.

EXAMPLE 2

N-methyl-N'-[β-(2,4,5-trichlorobenzyloxy)-β-(3',4'-dichlorophenyl)-ethyl]-piperazine dihydrochloride A mixture of 23 g. (0.1 mole) of N-methyl-N'-[β-hydroxy-β-(3,4-dichlorophenyl)-ethyl]-piperazine, 4.8 g. of sodium hydride in 50% oily suspension and 250 ml. of anhydrous toluene was heated at 120° C. for 1 hour. The mixture was cooled to 50° C. and treated with a solution of 23 g. (0.1 mole) of 2,4,5-trichlorobenzyl-chloride in 40 ml. of anhydrous toluene. The mixture was again heated to 120° C. for 18 hours and then cooled and treated with 300 g. of ice, the aqueous solution being separated and rewashed with water. The organic phase was extracted with 350 ml. of 2 N HCl. From this acidic solution, by alkalinisation with 40% NaOH and extraction with 300 ml. of ethyl ether, an ethereal solution of the base was obtained which, with HCl, gave 26 g. of crude product. After crystallization from ethyl acetate+isopropanol, 17.5 g. was obtained having a melting point=204–208° C.

Various products according to the invention, prepared by the reaction schemes set out above, are included in the following table.

TABLE I $$R-CH-CH_2-N\underset{OR_1}{\bigcirc}N-CH_3$$

| Ex. | R | $R_1$ | Formula of product obtained | Melting point (° C.) |
|---|---|---|---|---|
| 3 | 3,4-dichlorophenyl | 4-chlorobenzyl | $C_{20}H_{23}Cl_3N_2O \cdot 2HCl$ | 240–243 |
| 4 | 3,4-dichlorophenyl | 3,4-dichlorobenzyl | $C_{20}H_{22}Cl_4N_2O \cdot 2HCl$ | 237–240 |
| 5 | 3,4-dichlorophenyl | 2,4,5-trichlorobenzyl | $C_{20}H_{21}Cl_5N_2O \cdot 2HCl$ | 204–208 |
| 6 | 4-cyclopentylphenyl | 4-chlorobenzyl | $C_{25}H_{33}ClN_2O \cdot 2HCl$ | 223–225 |
| 7 | 4-cyclopentylphenyl | 2,4,5-trichlorobenzyl | $C_{25}H_{31}Cl_3N_2O \cdot 2HCl$ | 227–229 |
| 8 | 4-hexylphenyl | 3,4-dichlorobenzyl | $C_{26}H_{36}Cl_2N_2O \cdot 2HCl$ | [1] 215–219 |
| 9 | 4-hexylphenyl | 2,4,5-trichlorobenzyl | $C_{26}H_{35}Cl_3N_2O \cdot 2HCl$ | [1] 195–199 |
| 10 | 2,4-dichloro-5-methylenedioxyphenyl | 4-chlorobenzyl | $C_{21}H_{24}Cl_4N_2O_2 \cdot HCl$ | 95–96.5 |

[1] Hygroscopic product.

What is claimed is:
1. A compound selected from the group consisting of:
(a) a compound of the formula

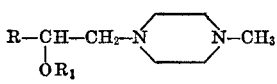

in which
R is phenoxymethylene; phenoxymethylene which is substituted in the ring with cyclopentyl, cyclohexyl, 2 or 3 chlorine atoms or 2 chlorine atoms and nitro; or phenyl substituted with cyclopentyl, cyclohexyl, 2 or 3 chlorine atoms or 2 chlorine atoms and nitro; and
$R_1$ is benzyl substituted in the ring with 1, 2, or 3 chlorine atoms; and
(b) a pharmaceutically acceptable acid addition salt thereof.

2. The compound as claimed in claim 1 which is an addition salt with hydrochloric, sulphuric, phosphoric or citric acid.

3. The compound as claimed in claim 1 which is N-methyl-N'-[β(4 - chlorobenzyloxy)-β-(4' - cyclopentylphenyl)-ethyl]-piperazine dihydrochloride.

4. The compound as claimed in claim 1, which is N-methyl-N'-[β - (2,4,5 - trichlorobenzyloxy)-β-(3',4'-dichlorophenyl)-ethyl]-piperazine dihydrochloride.

5. The compound as claimed in claim 1 which is N-methyl-N'-[β-(4-chlorobenzyloxy) - β - (3',4'-dichlorophenyl)-ethyl]-piperazine dihydrochloride.

6. The compound as claimed in claim 1, which is N-methyl-N'-[β - (2,4 - dichlorobenzyloxy)-β-(3',4'-dichlorophenyl)-ethyl]-piperazine dihydrochloride.

7. The compound as claimed in claim 1, which is N-methyl-N'-[β - (2,4,5 - trichlorobenzyloxy)-β-(4'-cyclopentylphenyl)-ethyl]-piperazine dihydrochloride.

8. The compound as claimed in claim 1 which is N-methyl-N'-[β - (4-chlorobenzyloxy)-β-(2',4',6'-trichlorophenoxymethyl)-ethyl]-piperazine monohydrochloride.

References Cited
UNITED STATES PATENTS

| | | | |
|---|---|---|---|
| 2,738,351 | 3/1956 | Dickison | 260—268 R |
| 3,180,867 | 4/1965 | Shapiro | 260—268 R |
| 3,236,892 | 2/1966 | Petracek | 260—268 R |
| 3,501,769 | 3/1970 | Crowther | 260—268 R |
| 3,505,334 | 4/1970 | Regnier | 260—268 R |

DONALD G. DAUS, Primary Examiner

U.S. Cl. X.R.

260—348 R, 592, 999